(12) United States Patent
Kohlböck

(10) Patent No.: US 8,365,894 B2
(45) Date of Patent: Feb. 5, 2013

(54) HYDRAULIC SYSTEM

(75) Inventor: Markus Kohlböck, Ottnang a. H. (AT)

(73) Assignee: MAGNA Powertrain AG & Co KG, Lannach (AT)

( * ) Notice: Subject to any disclaimer, the term of this patent is extended or adjusted under 35 U.S.C. 154(b) by 612 days.

(21) Appl. No.: 12/630,914

(22) Filed: Dec. 4, 2009

(65) Prior Publication Data

US 2010/0155192 A1 Jun. 24, 2010

(30) Foreign Application Priority Data

Dec. 22, 2008 (DE) .......................... 10 2008 064 452

(51) Int. Cl.
  *F15B 19/00* (2006.01)
  *G01L 27/00* (2006.01)
  *F16D 25/12* (2006.01)

(52) U.S. Cl. ................... 192/85.63; 192/30 W; 73/1.59; 73/1.63; 60/452

(58) Field of Classification Search ............... 192/30 W; 73/1.57–1.59, 1.63, 1.64, 115.04
See application file for complete search history.

(56) References Cited

U.S. PATENT DOCUMENTS

| | | | | |
|---|---|---|---|---|
| 3,777,546 A | * | 12/1973 | Rollins | ........................ 73/1.57 |
| 4,051,712 A | * | 10/1977 | Zias et al. | ...................... 73/1.62 |
| 4,897,584 A | | 1/1990 | Grutzmacher et al. | |
| 6,640,611 B2 | * | 11/2003 | Ericson et al. | ................. 73/1.57 |
| 6,681,912 B2 | * | 1/2004 | Suzuki et al. | .............. 192/85.63 |
| 7,033,073 B2 | | 4/2006 | Hoppe | |

FOREIGN PATENT DOCUMENTS

| | | |
|---|---|---|
| DE | 4408421 A1 | 9/1995 |
| DE | 4408421 C2 | 9/1995 |
| DE | 102005031552 A1 | 1/2007 |
| EP | 0648960 A2 | 4/1995 |
| EP | 0648960 B1 | 4/1995 |
| EP | 1150031 A1 | 10/2001 |
| WO | WO-03021749 A1 | 3/2003 |
| WO | WO-2006092348 A1 | 9/2006 |

\* cited by examiner

*Primary Examiner* — Richard M. Lorence

(74) *Attorney, Agent, or Firm* — Harness, Dickey & Pierce, P.L.C.

(57) ABSTRACT

A hydraulic system is presented with a hydraulic fluid, with a work element actuable by the fluid, with a fluid pump for the application of a fluid pressure to the fluid, with the fluid pump being operable to generate a reference depression in the system, and with a pressure sensor for the measurement of the fluid pressure which is in communication with a control unit which is designed to carry out a calibration of the pressure sensor with reference to the reference depression.

22 Claims, 2 Drawing Sheets

HYDRAULIC SYSTEM

CROSS-REFERENCE TO RELATED APPLICATIONS

This application claims the benefit and priority of German Patent Application No. 10 2008 064 452.8, filed Dec. 22, 2008. The entire disclosure of the above application is incorporated herein by reference in its entirety.

FIELD

The present disclosure relates to a hydraulic system with a hydraulic fluid, with a work element which can be actuated by the fluid, with a fluid pump for the application of a fluid pressure to the fluid and with a pressure sensor for the measurement of the fluid pressure.

BACKGROUND

This section provides background information related to the present disclosure which is not necessarily prior art.

Such hydraulic systems are generally known and are used, for example, in motor vehicles for the actuation of a friction clutch (e.g. of a transfer case).

A problem generally exists in such systems of a temperature-induced and/or age-induced zero point migration of the pressure sensor, also called offset drift, which results in a falsification of the measured results supplied by the pressure sensor.

For the first calibration or for the recalibration of the pressure sensor, a pressureless state of the hydraulic system is usually established in that an air bleed valve which separates the hydraulic system from the environment is opened so that the hydraulic system can be set to the environmental pressure. The pressureless state of the hydraulic system (i.e., the status of the hydraulic system at environmental pressure) is then used for the calibration of the pressure sensor (i.e., for the compensation of the sensor offset). The provision of such an air bleed valve means an unwanted apparatus and economic effort.

SUMMARY

This section provides a general summary of the disclosure, and is not a comprehensive disclosure of its full scope or all of its features.

It is an object of the present disclosure to provide a hydraulic system of the initially named kind which allows the calibration of a pressure sensor without the hydraulic system having to be brought into a pressureless state for this purpose and in particular without an air bleed valve absolutely being required.

A hydraulic system in accordance with the present disclosure includes a hydraulic fluid, a work element actuable by the fluid, a fluid pump for the application of a fluid pressure to the fluid and a pressure sensor for the measurement of the fluid pressure. The fluid pump is operable to generate a reference depression in the system. The pressure sensor is in communication with a control unit which is designed to carry out a calibration of the pressure sensor with reference to the reference pressure.

In accordance with the invention, the calibration of the pressure sensor therefore does not take place in a pressureless state of the hydraulic system (i.e., with the environmental pressure as the reference), but rather with reference to a reference depression. That depression (sometimes also called a negative pressure) is called the reference depression here which can be achieved as a maximum by the fluid pump at maximum pumping capacity and under normal operating conditions, in particular normal operating conditions in the automotive area. If the pumping capacity of the fluid pump is sufficiently high, the reference pressure can approximate the vapor pressure of the fluid or even correspond to it. The vapor pressure is the pressure at which the hydraulic fluid in the closed system is simultaneously present in the liquid phase and in the gaseous phase.

For this purpose, the fluid pump is operable in two directions, namely, on the one hand, in a working or forward direction in which it applies a pressure to the fluid which effects an actuation of the work element and, on the other hand, in the opposite direction which results in the generation of a depression in the hydraulic system due to the closed nature of the hydraulic system with respect to the environment. The depression ultimately being formed in the hydraulic system as a result of the pumping of the fluid pump in the opposite direction is used as the reference pressure for the calibration of the pressure sensor in accordance with the present disclosure.

In this respect, the depression which is adopted as a maximum (i.e., the reference depression, in accordance with the vapor pressure of the fluid) is largely independent of the temperature prevailing in the system over a temperature range relevant to automotive applications from approximately $-40°$ C. to $+110°$ C. so that a calibration of the pressure sensor is possible reliably over this temperature range.

In the simplest case, the calibration of the pressure sensor is carried out in that the offset of the pressure sensor (i.e., that is the difference between the actual reference depression value and the pressure value measured by the pressure sensor at the reference depression) is determined and is taken into account by a so-called offset shift in the evaluation of the data output by the pressure sensor.

Since the calibration of the pressure sensor only requires that the hydraulic system is closed with respect to the environment, the hydraulic system in accordance with the present disclosure generally does not have to have an air bleed valve which allows the establishing of a pressureless state of the system. Such an air bleed valve is also generally not required for the establishing of the fluid pressure required for a desired actuation of the work element since the fluid pressure can be established in a desired manner by a corresponding control of the fluid pump operable in opposite directions. The hydraulic system in accordance with the present disclosure can consequently be equipped without an air bleed valve to establish a pressureless state (i.e., to set ambient pressure in the system).

As a result, the hydraulic system in accordance with the present disclosure allows a simple calibration of the pressure sensor, which can be carried out, for example, at regular intervals, without the system having to be brought into a pressureless state for this purpose, whereby a permanently increased measurement precision of the pressure sensor and ultimately a more precisely working total system is achieved.

In accordance with an embodiment, the control unit is also provided for the control of the fluid pump. The control unit so-to-say therefore satisfies a dual function in that it not only carries out the calibration of the pressure sensor, but also takes over the control of the fluid pump. By the communication with the pressure sensor, it allows the control unit to control the fluid pump such that a desired fluid pressure is adopted in the hydraulic system.

A pressure relief valve can be provided to limit the fluid pressure which can be adopted in the hydraulic system to a maximum possible value.

The fluid pump can be any pump which is suitable to work in opposite directions. A gerotor pump can be named purely by way of example in this connection; but other suitable pump types can naturally also be considered.

The control unit is preferably designed to operate the fluid pump at a lower pumping capacity during the determination of the reference depression than during the generation of the depression. To establish depression in the system as fast as possible, pumping can thus initially take place at a higher capacity, whereas pumping only takes place with reduced capacity after reaching the reference pressure to maintain the balanced state. It is avoided by the reduction of the pumping capacity that air is sucked into the system unintentionally, e.g. via the pressure relief valve.

The control unit is advantageously designed only to determine the reference depression after the end of a preset waiting period, of e.g. approximately 0.2 s, after the generation of the depression. The preset waiting time is in this respect preferably selected so that it is ensured that the measurement of the reference depression and thus ultimately the calibration of the pressure sensor is only carried out after setting a balanced state.

Alternatively, the control unit can be designed to determine the reaching of the reference depression by determining a pressure gradient and by comparison of the pressure gradient with a threshold value. In this respect, the balanced state is therefore not assumed after the end of a preset waiting period, but is rather actually determined with reference to the pressure development. As soon as the pressure gradient has exceeded the threshold value, the calibration of the pressure sensor can be carried out.

As mentioned, the reference depression is essentially independent of the fluid temperature prevailing in the system over a wide temperature range. Nevertheless, the control unit can be designed to increase the calibration precision to carry out the calibration of the pressure sensor while taking account of the actual fluid temperature.

To detect the fluid temperature, a sensor, in particular a sensor arranged in a fluid sump of the system, can be used, for example, which is typically anyway provided.

Alternatively or additionally, the control unit can be designed to determine the temperature of the fluid pump and to derive the fluid temperature from this. If the fluid pump includes an electric motor, the temperature of the fluid pump can be determined, for example, from the electrical resistance of the armature windings which is determined during an operating pause of the electric motor. The fluid temperature can also be determined without an additional sensor in this manner.

If the fluid temperature is known, the reference depression applicable to the respective fluid temperature can thus be determined from this, for example, with reference to a look-up table, and the pressure sensor calibration can be carried out.

In accordance with an embodiment, the work element includes a piston displaceable journalled in a cylinder, in particular for the actuation of a clutch (e.g., of a friction clutch). Specifically, the clutch can be the clutch of a torque transfer device which serves (e.g., in a vehicle with all-wheel drive) to transfer a portion of the driving torque to a secondary drive axle. For example, the torque transfer device can be a transfer case which serves for the distribution of a torque to two output shafts. Alternatively, the clutch can be arranged in a lock of an axle differential or in a torque transfer device effective in the transverse direction (torque vectoring).

A further subject of the present disclosure is accordingly a torque transfer device with a drive shaft and an output shaft, with a clutch, in particular a friction clutch, for the transfer of a torque from the drive shaft to the output shaft, and with a hydraulic system for the actuation of the clutch, with the hydraulic system comprising: a hydraulic fluid, a fluid pump for the application of a fluid pressure to the fluid, with the fluid pump being operable to generate a reference depression, and a pressure sensor for the measurement of the fluid pressure which is in communication with a control unit which is designed to carry out a calibration of the pressure sensor with reference to the reference depression.

The above-named advantages can be achieved accordingly by the transmission in accordance with the present disclosure and its advantageous embodiments.

A further subject matter of the present disclosure is moreover a method for the calibration of a pressure sensor which is provided for the measurement of the fluid pressure of a hydraulic fluid contained in a hydraulic system, in which method a reference depression is produced in the system by means of a pump and a calibration of the pressure sensor is carried out with reference to the reference depression.

A calibration of the pressure sensor can be carried out in a simple and reliable manner with the help of the method in accordance with the present disclosure without the hydraulic system having to be brought into a pressureless state for this purpose. It is thus possible also to calibrate pressure systems of those systems which are closed with respect to the environment and do not have air bleed valves which permit a setting of the hydraulic system to environmental pressure. Advantageous embodiments of the method in accordance with the present disclosure result from the above embodiments.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Figure 1:
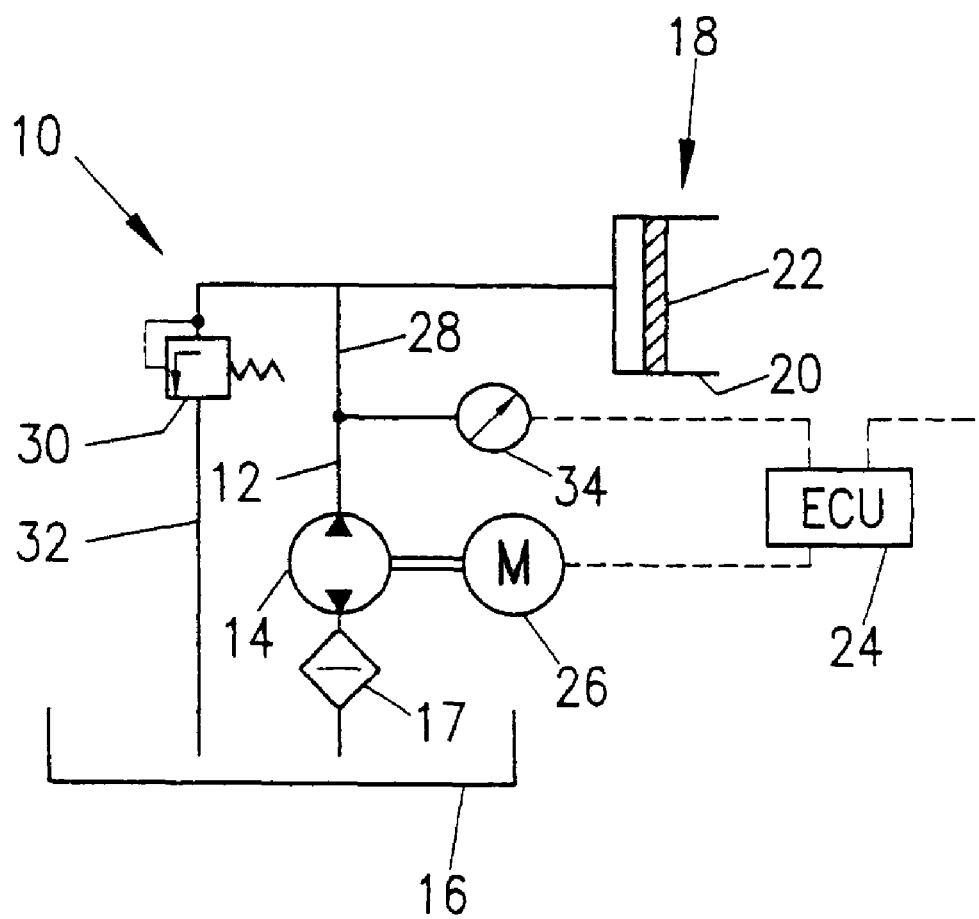
FIG. 1 is a schematic representation of a hydraulic system in accordance with the present disclosure.

The hydraulic system shown in FIG. 1 includes a hydraulic circuit 10 which contains a hydraulic fluid and which is closed with respect to the environment.

A fluid pump 14, e.g. a gerotor pump, is arranged in a first line 12 of the hydraulic circuit 10 and serves to convey hydraulic fluid from a fluid reservoir 16 to a work element 18. A filter 17 is connected between the fluid pump 14 and the fluid reservoir 16.

The work element 18 includes a piston 22 which is displaceably journalled in a cylinder 20 and which can be provided e.g. for the actuation of a friction clutch of a transfer case.

A control unit 24 is connected to a motor 26 of the fluid pump 14 for the control of the fluid pump 14. The fluid pump 14 can be operated in a first direction (forward or working direction), in which it conveys hydraulic fluid from the fluid reservoir 16 to the work element 18, and in a second direction (counter-direction), in which it conveys hydraulic fluid from the work element 18 to the fluid reservoir 16.

If the fluid pump 14 is operated in the forward direction, an increased pressure builds up in the section 28 of the first line 12 disposed between the fluid pump 14 and the work element 18. As a result, the fluid conveyed through the fluid pump 14 to the work element 18 exerts pressure onto the piston 22, whereby it is displaced in the cylinder 20 (to the right in FIG. 1), e.g. against the restoration force of a spring element.

If the increased fluid pressure in the line section 28 exceeds a limit value defined by a pressure relief valve 30, the pressure relief valve 30 opens and fluid can flow back from the first line 12 via a second line 32 into the fluid reservoir 16 to reduce the fluid pressure.

A pressure sensor 34 known per se is provided for the measurement of the fluid pressure in the line section 28. The pressure sensor 34 is connected to the control unit 24 and is read out by it to enable an operation of the fluid pump 14 such that a desired fluid pressure is adopted in the line section 28 and a desired force is applied to the piston 22 of the work element 18.

The pressure sensor 34 is recalibrated regularly to ensure a sufficient precision of the measurement of the fluid pressure. For this purpose, the fluid pump 14 is operated in the counter-direction so that a depression is adopted in the line section 28. The depression achievable at a maximum under normal conditions by the fluid pump 14 is called the reference depression.

Figure 2:
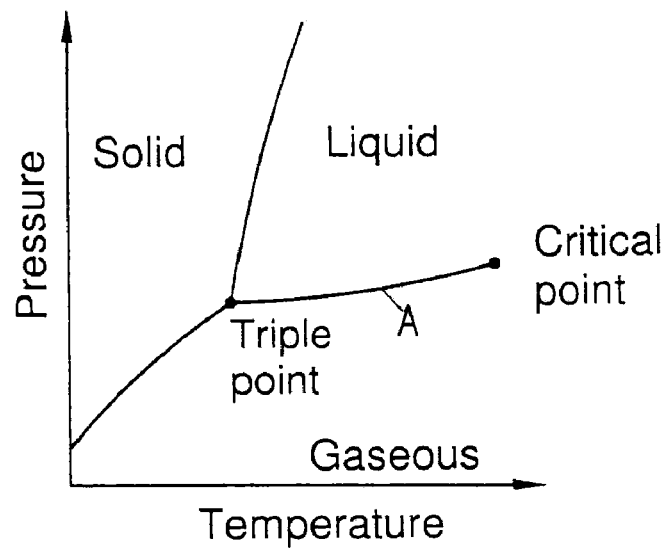
FIG. 2 is an exemplary phase diagram of a hydraulic fluid of the system of FIG. 1.

With a sufficiently high pumping capacity of the fluid pump 14, the reference depression can lie in the range of the vapor pressure of the hydraulic fluid (i.e., in the range of the pressure at which the hydraulic fluid is present simultaneously in the liquid phase and in the gaseous phase). The development of the vapor pressure of the hydraulic fluid is shown by way of example by the curve section A in the phase diagram of FIG. 2.

In practice, the fluid pump 14 will normally not be dimensioned so thick that the reference depression actually corresponds to the vapor pressure of the hydraulic fluid under operating conditions, in particular operating temperatures, which typically occur e.g. in the automotive area. Nevertheless, a reference depression will be adopted in the line section 28 which, similar to the vapor pressure, is substantially constant over a wide temperature range.

Figure 3:
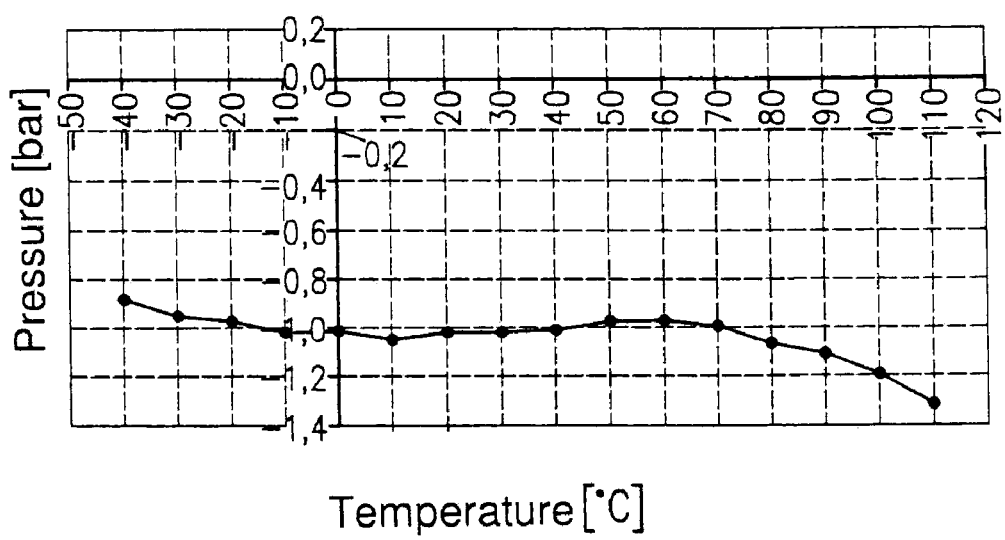
FIG. 3 is a diagram which shows the reference depression achievable in the system of FIG. 1 in dependence on the temperature.

In FIG. 3, the depression which can be achieved at a maximum at different temperatures (i.e. that is the reference depression) for a hydraulic fluid is shown by way of example. As can be seen from FIG. 3, the reference depression has a comparatively small dependence on the temperature over the temperature range in particular relevant in the automotive sector from −40° C. to 100° C.

The reference depression is consequently suitable for a use as the reference value in the calibration of the pressure sensor 34. This applies in particular on a use of the hydraulic system in a motor vehicle since the temperature range shown in FIG. 3 includes the temperatures which typically occur in an automotive use.

As already mentioned, the pressure sensor 34—controlled by the control unit 34—is automatically recalibrated at regular time intervals, with an exact observation of the exact time intervals not being necessary. Alternatively or additionally, it is naturally also possible to recalibrate the pressure sensor 34 within the framework of servicing work (e.g., on a visit to the shop).

If a calibration of the pressure sensor 34 should be carried out, the control unit 24 outputs a corresponding signal to the motor 26 to operate the fluid pump 14 in the opposite direction. As soon as the fluid pressure detected by the pressure sensor 34 has reached a stable minimum (i.e., as soon as the reference depression has been adopted in the line section 28) the pressure sensor 34 is calibrated by the control unit 24 using the reference depression as the reference value. After the end of the calibration procedure, the fluid pump 14 can be stopped or can be operated in the forward direction again.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A hydraulic system comprising:
    a hydraulic fluid;
    a work element actuable by the fluid;
    a fluid pump for application of a fluid pressure to the fluid, the fluid pump being operable in a first direction to convey fluid pressure to the work element and in a second direction to generate a reference depression in the system;
    a pressure sensor for measurement of the fluid pressure; and
    a control unit connected to the pressure sensor and operable to carry out a calibration of the pressure sensor with reference to the reference depression.

2. The system in accordance with claim 1, wherein the control unit is further operable to control the fluid pump.

3. The system in accordance with claim 1, further including a line section providing fluid communication between the pump and the work element, wherein the pressure sensor is disposed in the line section between the pump and the work element and wherein the reference depression is established in the line section and compared to the pressure value measured by the pressure sensor to calibrate the pressure sensor.

4. The system in accordance with claim 1, wherein the control unit is designed to operate the fluid pump during the determination of the reference depression at a lower pumping capacity than during the generation of the depression.

5. The system in accordance with claim 1, wherein the control unit determines the reference depression after a preset waiting time following generation of the depression.

6. The system in accordance with claim 1, wherein the control unit determines the reaching of the reference depression by determination of a pressure gradient and by comparison of the pressure gradient with a threshold value.

7. The system in accordance with claim 1, wherein a pressure relief valve is provided for the restriction of the fluid pressure to a minimum value.

8. The system in accordance with claim 1, wherein the control unit carries out the calibration of the pressure sensor while taking account of the actual fluid temperature.

9. The system in accordance with claim 1, wherein the control unit is operable to determine the temperature of the fluid pump and to derive the fluid temperature from this.

10. The system in accordance with claim 1, wherein the work element includes a piston displaceably journalled in a cylinder for actuation of a clutch.

11. The system in accordance with claim 1, wherein the work element is provided for the actuation of a clutch of a torque transfer device.

12. A torque transfer device with a drive shaft and an output shaft, with a clutch for the transfer of a torque from the drive shaft to the output shaft and with a hydraulic system for the actuation of the clutch, wherein the hydraulic system comprises:
- a hydraulic fluid;
- a fluid pump for the application of a fluid pressure to the fluid, with the fluid pump being operable in a first direction to convey fluid for actuating the clutch and in a second direction to generate a reference depression in the system;
- a pressure sensor for the measurement of the fluid pressure; and
- a control unit connected to the pressure sensor and operable to carry out a calibration of the pressure sensor with reference to the reference depression.

13. A method for the calibration of a pressure sensor which is provided for the measurement of the fluid pressure of a hydraulic fluid contained in a hydraulic system, comprising the steps of
- actuating a clutch by means of a fluid pump, wherein the clutch is actuated by fluid pressure generated by operation of the fluid pump in a first direction;
- generating a reference depression in the system by means of the fluid pump, wherein the depression is generated by operation of the fluid pump in a second direction opposite the first direction; and
- calibrating the pressure sensor with reference to the reference depression.

14. The method in accordance with claim 13, wherein the calibration of the pressure sensor takes place by a control unit provided for the control of the fluid pump and which is connected to the pressure sensor.

15. The method in accordance with claim 13, wherein the fluid pressure is generated upon operation of the fluid pump in a first direction, and wherein the depression is generated by operation of the fluid pump in a second direction.

16. The method in accordance with claim 13, wherein the fluid pump works at a lower pumping capacity during the determination of the reference depression than during the generation of the depression.

17. The method in accordance with claim 13, wherein the reference depression is only determined after the end of a preset waiting time after the generation of the depression.

18. The method in accordance with claim 13, wherein the reaching of the reference depression is determined by determination of a pressure gradient and by comparison of the pressure gradient with a threshold value.

19. The method in accordance with claim 13, wherein the pressure sensor is calibrated while taking account of the actual fluid temperature.

20. The method in accordance with claim 13, wherein the temperature of the fluid pump is determined and the fluid temperature is derived from this.

21. The method in accordance with claim 13, wherein the hydraulic system serves for the actuation of a clutch.

22. The method in accordance with claim 13, wherein the hydraulic system serves for the actuation of a friction clutch in a torque transfer device.

* * * * *